(12) United States Patent
Cocquet et al.

(10) Patent No.: US 12,312,444 B2
(45) Date of Patent: May 27, 2025

(54) BLOCK-COPOLYMER-BASED STRETCHABLE, FLEXIBLE, WATERPROOF AND BREATHABLE FILM

(71) Applicant: Arkema France, Colombes (FR)

(72) Inventors: Clio Cocquet, Bernay (FR); Quentin P. Pineau, Evreux (FR)

(73) Assignee: ARKEMA FRANCE, Puteaux (FR)

( * ) Notice: Subject to any disclaimer, the term of this patent is extended or adjusted under 35 U.S.C. 154(b) by 119 days.

(21) Appl. No.: 16/763,566

(22) PCT Filed: Nov. 16, 2018

(86) PCT No.: PCT/FR2018/052877
§ 371 (c)(1),
(2) Date: May 13, 2020

(87) PCT Pub. No.: WO2019/097184
PCT Pub. Date: May 23, 2019

(65) Prior Publication Data
US 2020/0362108 A1    Nov. 19, 2020

(30) Foreign Application Priority Data
Nov. 17, 2017   (FR) ..................... 17.60883

(51) Int. Cl.
*C08G 69/40* (2006.01)
*B32B 5/02* (2006.01)
(Continued)

(52) U.S. Cl.
CPC .............. *C08G 69/40* (2013.01); *B32B 5/022* (2013.01); *B32B 27/12* (2013.01); *B32B 27/18* (2013.01);
(Continued)

(58) Field of Classification Search
CPC ........ C08G 69/12; C08G 69/14; C08G 69/16; C08G 69/18; C08G 69/20; C08G 69/22;
(Continued)

(56) References Cited

U.S. PATENT DOCUMENTS

| | | | |
|---|---|---|---|
| 5,360,888 A | 11/1994 | Ullrich | |
| 6,607,797 B1* | 8/2003 | Ritter | ...................... D03D 1/02 428/35.2 |

(Continued)

FOREIGN PATENT DOCUMENTS

| | | |
|---|---|---|
| CN | 104583321 A | 4/2015 |
| EP | 2886608 A1 | 6/2015 |

(Continued)

OTHER PUBLICATIONS

First Office Action dated Mar. 30, 2022, issued in the corresponding Chinese Patent Application No. 201880074582.4, 15 pages including 10 pages of English Translation.

(Continued)

*Primary Examiner* — James C Yager
(74) *Attorney, Agent, or Firm* — Boone IP Law

(57) ABSTRACT

The invention relates to a flexible, stretchable, waterproof breathable film based on a block copolymer comprising at least one rigid polyamide PA block and at least one flexible block, characterized in that said copolymer includes at least one carboxylic acid chain end blocked with a polycarbodiimide. The invention also relates to the use of a polycarbodiimide in a process for manufacturing a film based on a copolymer containing polyamide blocks and flexible blocks including at least one carboxylic acid chain end, for improving, simultaneously, the extrudability of the copolymer, the drawability of the copolymer in film form and/or for improving the extrusion rate of said copolymer, and for improving (Continued)

Elongational rheology

Copo 3 according to the invention (top curve)
compared to PEBA 3 (bottom curve)

the stretchability of the film, the flexibility of the film, its abrasion resistance and its tear strength.

20 Claims, 2 Drawing Sheets

(51) Int. Cl.
| | |
|---|---|
| *B32B 27/12* | (2006.01) |
| *B32B 27/18* | (2006.01) |
| *B32B 27/28* | (2006.01) |
| *C08J 5/18* | (2006.01) |
| *C09D 177/00* | (2006.01) |

(52) U.S. Cl.
CPC ............... *B32B 27/281* (2013.01); *C08J 5/18* (2013.01); *C09D 177/00* (2013.01); *B32B 2262/0253* (2013.01); *B32B 2270/00* (2013.01); *B32B 2307/7265* (2013.01); *C08J 2379/08* (2013.01)

(58) Field of Classification Search
CPC .... C08G 69/40; C08G 81/025; C08G 81/028; C08G 69/48; C08J 5/18; C08J 2379/08; C09D 177/00; B32B 5/022; B32B 27/12; B32B 27/18; B32B 27/281; B32B 2262/0253; B32B 2270/00; B32B 2307/7265

See application file for complete search history.

(56) References Cited

U.S. PATENT DOCUMENTS

| | | | |
|---|---|---|---|
| 9,512,314 B2* | 12/2016 | Satou | ............. B01F 15/06 |
| 10,166,373 B2* | 1/2019 | Ward | ............. A61M 25/104 |
| 2003/0211340 A1* | 11/2003 | Ikeno | ............. D06N 3/128 |
| | | | 428/447 |
| 2005/0203253 A1* | 9/2005 | Chou | ............. D01F 6/90 |
| | | | 525/302 |
| 2005/0244664 A1* | 11/2005 | Bekele | ............. B32B 27/18 |
| | | | 428/474.7 |
| 2010/0003486 A1 | 1/2010 | Lalgudi et al. | |
| 2010/0217211 A1* | 8/2010 | Lorenz | ............. C08G 81/00 |
| | | | 623/1.13 |
| 2013/0171388 A1 | 7/2013 | Pawlik et al. | |
| 2015/0210852 A1 | 7/2015 | Satou et al. | |
| 2016/0229966 A1 | 8/2016 | Schmitzer et al. | |
| 2017/0313879 A1* | 11/2017 | Kobayashi | ............. B29C 45/00 |

FOREIGN PATENT DOCUMENTS

| | | |
|---|---|---|
| JP | 2002-212418 A | 7/2002 |
| JP | 2013-139568 A | 7/2013 |
| JP | 2014-037464 A | 2/2014 |
| JP | 2015-224258 A | 12/2015 |

OTHER PUBLICATIONS

Office Action (Notice of Reasons for Rejection) issued on Nov. 8, 2022, by the Japanese Patent Office in corresponding Japanese Patent Application No. 2020-526528, and an English Translation of the Office Action. (12 pages).

* cited by examiner

Elongational rheology

Copo 3 according to the invention (top curve)
compared to PEBA 3 (bottom curve)

Elongational rheology

Copo 4 according to the invention (top curve)
compared to PEBA 4 (bottom curve)

BLOCK-COPOLYMER-BASED STRETCHABLE, FLEXIBLE, WATERPROOF AND BREATHABLE FILM

This application claims benefit, under U.S.C. § 119 or § 365 of PCT Application Number PCT/FR2018/052877, filed Nov. 16, 2018, and French Patent Applications Number FR 17.60883, filed Nov. 17, 2017, these documents being incorporated herein by reference.

FIELD OF THE INVENTION

The present invention relates to waterproof breathable films based on block copolymers, which are permeable to moisture vapor and impermeable to water. These films may be used notably in the food, wrapping or sports equipment sector, or in construction, notably as an insulating material under the roof of buildings and for wall insulation.

In these sectors, it is important to have available films that are, simultaneously, flexible, stretchable, strong, i.e. tear-resistant, abrasion-resistant and recyclable and which have sufficient permeability to moisture vapor.

The permeability to moisture vapor is evaluated by means of the MVTR parameter (Moisture Vapor Transmission Rate). In particular, it is desirable for a waterproof breathable film to have an MVTR value, measured by the standard ASTM E96, of at least 100 g/m2 per 24 hours at 23° C. for a relative humidity rate of 50% and a sample thickness of 30 µm. In certain block copolymers, increasing the content of polyether groups makes it possible to increase the permeability to moisture vapor of these copolymers.

The aim of the present invention is to improve the flexibility, stretchability and strength of these films and their abrasion resistance, without modifying their permeability to moisture vapor.

The flexibility is evaluated by means of the following moduli: the tensile modulus according to the standard ISO 527 1A:2012, and the flexural modulus at 23° C. according to the standard ISO 178:2010. A decrease in these modulus values tends toward better flexibility of the films.

The stretchability is evaluated by means of the elongational rheology test, as defined hereinbelow in the examples of the present patent application.

The abrasion resistance is evaluated by the loss of mass according to the standard ISO 527-1A:2012: the lower the loss of mass of the material, the better the abrasion resistance of films made from this material.

The tear strength is, for its part, evaluated according to the standard ISO 34-1:2015.

Among the block copolymers known for the manufacture of waterproof breathable films, mention may be made of copolymers containing polyamide blocks and polyether blocks (PEBA). These PEBA belong to the particular class of polyetheresteramides when they result from the copolycondensation of polyamide blocks bearing reactive carboxylic ends with polyether blocks bearing reactive ends, which are polyetherpolyols (polyetherdiols), the bonds between the polyamide blocks and the flexible polyether blocks being ester bonds.

PEBAs are known for their physical properties such as their flexibility, their impact strength and their ease of implementation by injection molding. However, these copolymers are difficult to transform into film form by extrusion, notably on account of the low melt viscosity and the low melt strength resulting therefrom.

Various means exist for modulating the melt viscosity of a polymer.

Thus, it may be envisaged to increase the polyamide content, which has a tendency to increase the viscosity. Moreover, extrudable polymer compositions may be obtained by compounding the block copolymer with other polymers, notably polyolefins. However, in both cases, this causes a reduction in the overall content of PEG present in the polymer composition and consequently reduces its permeability to moisture vapor.

It is also possible to increase the melt viscosity by lengthening the polymer chains, for example by prolonging the polymerization. This approach has been disappointing on account of the degradation of the PEG blocks, which also brings about yellowing of the material, without being able to achieve the desired levels of melt viscosity, of at least 300 Pa·s, measured according to the standard ISO 1621-10:2015.

Finally, it may be envisaged to increase the melt viscosity by simultaneously increasing the size of the various blocks of the polymer, for example of the polyamide blocks and of the polyether blocks in the case of PEBA. For example on passing, for a PEBA PA6-PEG, from 1500-1500 to 2000-2000, it should be possible to increase the melt viscosity for an equivalent degree of polymerization, without degrading the properties in terms of permeability to moisture vapor. However, the tests performed along these lines were inconclusive: the reactivity between the PA blocks and the PEG blocks is greatly reduced.

The aim of the invention is thus also to provide an improved process for manufacturing stretchable and flexible waterproof breathable films based on block copolymers, in which the extrusion is facilitated and the maximum achievable extrusion rates are increased.

SUMMARY OF THE INVENTION

The Applicant has now found that the use, under certain conditions, of a polycarbodiimide in a process for manufacturing a film based on a copolymer containing polyamide blocks and flexible blocks including at least one carboxylic acid chain end makes it possible to significantly improve the drawability of said copolymer in film form and/or to increase the extrusion rate of said copolymer, while at the same time improving the stretchability of the film thus obtained, the flexibility of the film, its abrasion resistance and its tear strength, without sacrificing the permeability to moisture vapor of the film obtained, or its recyclability.

Figure 1:
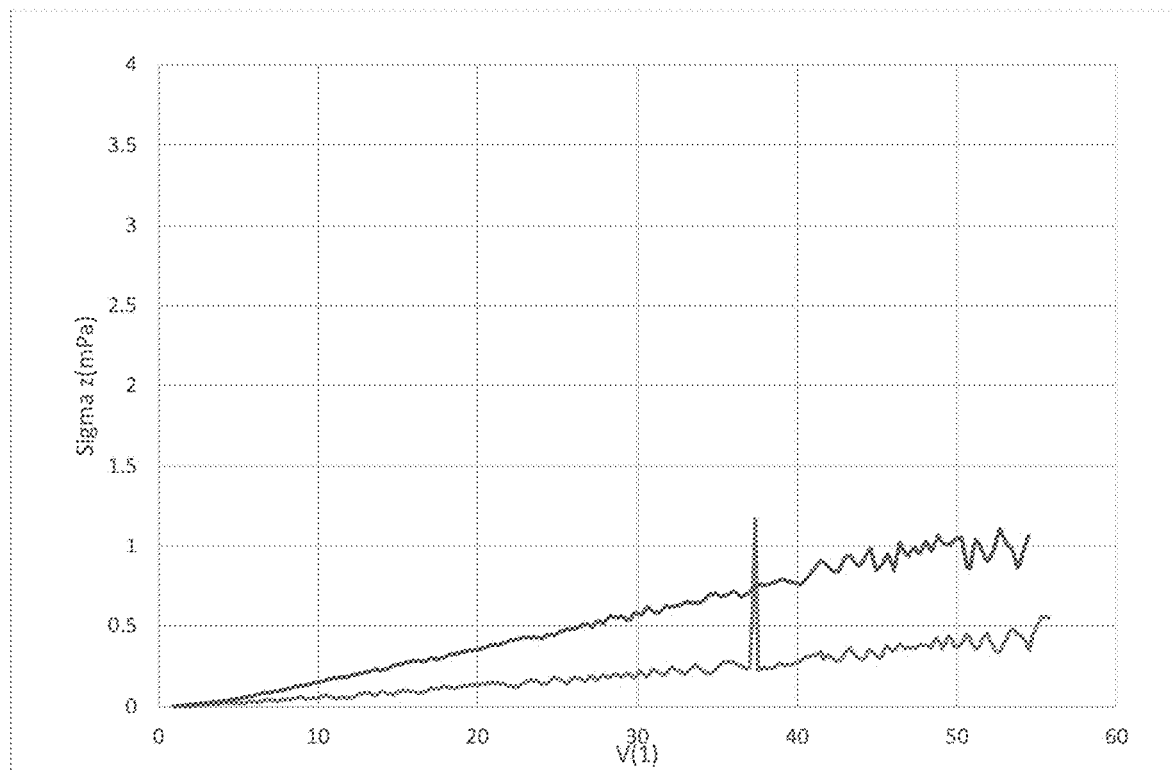
FIG. 1 represents the result of the elongational rheology measurement on PEBA 3 (bottom curve) and on Copo 3 (top curve).

listing of the invention aspects:
1. A flexible, stretchable, waterproof breathable film based on block copolymer comprising at least one rigid polyamide PA block and at least one flexible block, characterized in that said copolymer includes at least one carboxylic acid chain end blocked with a polycarbodiimide.
2. The film as in aspect 1, in which the weight-average molecular mass of the polycarbodiimide is greater than 10 000 g/mol, preferably within the range from 10 000 to 40 000 g/mol, preferably from 15 000 to 30 000 g/mol.

3. The film as in either of aspects 1 and 2, in which the weight content of the polycarbodiimide represents from 0.5% to 10% by weight, preferably from 0.5% to 7% by weight, preferably from 0.5% to 3% by weight, preferably from 0.5% to 2.5%, preferably from 0.5% to 2% by weight, relative to the total weight of the copolymer.

4. The film as in any one of aspects 1 to 3, in which said carboxylic acid forms a urea bond by reaction with the carbodiimide of the polycarbodiimide.

5. The film as in any one of aspects 1 to 4, characterized in that said copolymer is in noncrosslinked linear form, its dispersity Mw/Mn being less than 3.

6. The film as in any one of aspects 1 to 5, in which said flexible block comprises at least one block chosen from: polyether, polyester, polydimethylsiloxane, polyolefin, polycarbonate, and mixtures or copolymers thereof.

7. The film as in any one of aspects 1 to 6, in which said flexible block comprises at least one polyether PE, preferably chosen from PTMG, PPG, PO3G and/or PEG.

8. The film as in any one of aspects 1 to 7, in which said flexible block comprises at least one polyester PES, preferably chosen from polyester diols, poly (caprolactone) and polyesters based on fatty acid dimers.

9. The film as in any one of the preceding aspects, in which said at least one copolymer comprises from 45% to 75% by weight of flexible polyethylene glycol (PEG) blocks, preferably from 50% to 70% by weight of PEG blocks, relative to the total weight of copolymer.

10. The film as in any one of the preceding aspects, in which said polyamide PA block comprises at least one of the following polyamide units: 6, 66, 610, 612, PA1010, PA1012, PA11, PA12, PA6/12, PA6/66, and mixtures or copolyamides thereof.

11. The film as in any one of the preceding aspects, in which said at least one copolymer comprises a copolymer containing rigid polyamide blocks and flexible polyether (PEBA) blocks.

12. The film as in any one of the preceding aspects, in which said at least one copolymer is chosen from the following PEBAs: PA6-PEG, PA1010-PEG, PA1012-PEG, PA11-PEG, PA12-PEG, PA6/12-PEG, PA66-PEG, PA6/66-PEG, and mixtures thereof.

13. The film as in any one of aspects 1 to 9, in which the weight ratio of the PA blocks to the flexible blocks is within the range from 0.3 to 10, preferably from 0.3 to 6, preferably from 0.3 to 3, preferably from 0.3 to 2.

14. The copolymer-based film as in any one of aspects 1 to 13, characterized in that it comprises:
from 51% to 99.9% by weight of said block copolymer,
from 0.1% to 49% by weight of at least one other component chosen from polyamides, functional polyolefins, copolyetheresters, thermoplastic polyurethanes (TPU), copolymers of ethylene and vinyl acetate, copolymers of ethylene and of acrylate, and copolymers of ethylene and of alkyl (meth) acrylate, and/or
from 0.1% to 10% by weight of additives chosen from nucleating agents, fillers, notably mineral fillers, such as talc, reinforcing fibers, notably glass or carbon fibers, dyes, UV absorbers, antioxidants, notably phenolic or phosphorus-based or sulfur-based antioxidants, hindered-amine light stabilizers (HALS), and mixtures thereof,
relative to the total weight of the composition.

15. The film as in aspect 14, characterized in that it comprises a functional polyolefin including a grafting with a monomer chosen from the group comprising unsaturated carboxylic acids, unsaturated carboxylic anhydrides, vinyl monomers, acrylic monomers, and mixtures thereof.

16. The film as in aspect 15, in which the functional polyolefin is chosen from the group comprising ethylene-acrylic ester copolymers, ethylene-acrylic ester-maleic anhydride copolymers, and ethylene-acrylic ester-glycidyl methacrylate copolymers.

17. The film as in one of aspects 1 to 16, in which the film has a thickness of less than or equal to 25 µm, preferably within the range from 5 to 25 µm.

18. The use of a polycarbodiimide in a process for manufacturing a film based on a copolymer containing polyamide blocks and flexible blocks including at least one carboxylic acid chain end, for improving the extrudability and/or the drawability of the copolymer in film form and/or for improving the extrusion rate of said copolymer, in which at least one carboxylic acid chain end of the copolymer is blocked with a carbodiimide function of the polycarbodiimide.

19. The use of a polycarbodiimide in a film based on a copolymer containing polyamide blocks and flexible blocks including at least one carboxylic acid chain end, for improving the stretchability of the film, the flexibility of the film, its abrasion resistance and its tear strength, in which at least one carboxylic acid chain end of the copolymer is blocked with a carbodiimide function of the polycarbodiimide.

20. The use as in aspect 14 or 15, in which the polycarbodiimide has a weight-average molecular mass of greater than 10 000 g/mol, preferably within the range from 10 000 to 40 000 g/mol, preferably from 15 000 to 30 000 g/mol.

21. A process for manufacturing the film as in one of aspects 1 to 20, comprising the steps of:
a) providing the copolymer including at least one carboxylic acid chain end blocked with a polycarbodiimide, optionally as a mixture with other components of the film as defined in one of aspects 1 to 20,
b) extruding the copolymer or said mixture from step a),
c) drawing the copolymer or said mixture to form a film.

22. The process as in aspect 21, comprising, prior to step a), the mixing of the block copolymer comprising at least one rigid polyamide PA block and at least one flexible block and polycarbodiimide, so that at least one carboxylic acid chain end of the block copolymer reacts with a carbodiimide function of the polycarbodiimide.

23. The process as in aspect 22, characterized in that the mixing is performed using a single-screw or twin-screw extruder or by adding the polycarbodiimide during the synthesis of the block copolymer.

24. The process as in any one of aspects 21 to 23, in which the drawing step c) is performed by extrusion blow molding, blown film extrusion, pultrusion, overjacketing extrusion, extrusion calendering, flat-die extrusion, extrusion coating, lamination and/or coextrusion.

25. The process as in any one of aspects 21 to 24, in which step b) is performed at a temperature within the range from 100° C. to 300° C. and preferably from 150°° C. to 250° C.

26. A laminated product comprising at least one textile material and at least one film as aspected in one of aspects 1 to 17, said film adhering to at least one surface of the textile material with a peel force that is within the range from 0.5 to 50 N, preferably from 0.5 to 10 N.
27. The laminate as in aspect 26, in which said at least one textile material is in the form of a porous membrane, a woven textile or a nonwoven textile.
28. The laminate as in aspect 26 or 27, in which said at least one textile material comprises synthetic fibers, notably synthetic fibers obtained from biobased raw materials, natural fibers, artificial fibers manufactured from natural raw materials, mineral fibers and/or metallic fibers.
29. The laminate as in any one of aspects 26 to 28, in which said at least one textile material constitutes a felt, a filter, a film, a gauze, a cloth, a dressing, a layer, a fabric, a knitted fabric, a clothing article, an item of clothing, a bedding article, a furnishing article, a curtain, a passenger compartment covering, a functional technical textile, a geotextile and/or an agrotextile.
30. The use of a film as in any one of aspects 1 to 17, in the following sectors: medical, hygiene, luggage, manufacturing, clothing, domestic or household equipment, furnishing, carpet, motor vehicle, industry, notably industrial filtration, agriculture and/or construction.
31. The film as in any one of aspects 1 to 17, said film being a wrapping component, notably in the agri-food sector, a food wrapping film, a wrapping film for cooking and/or smoking, notably for sausages, a waterproof breathable film, notably used in construction, a textile component, a sports equipment, shoe, sports shoe, shoe sole, decorative, luggage, spectacle, furniture, audiovisual equipment, information technology, motor vehicle or aeronautical equipment component and/or a medical equipment component.

DESCRIPTION OF EMBODIMENTS OF THE INVENTION

In the present description, it is pointed out that when reference is made to ranges, expressions of the type "ranging from . . . to . . . " or "including/comprising from . . . to . . . " include the limits of the range. Conversely, expressions of the type "between . . . and . . . " exclude the limits of the range.
Unless otherwise mentioned, the percentages expressed are mass percentages. Unless otherwise mentioned, the parameters to which reference is made are measured at atmospheric pressure and at room temperature (20-25° C., generally 23° C.).

The invention is now described in detail and in a non-limiting manner in the description that follows.

One subject of the invention is thus a flexible, stretchable, waterproof breathable film based on a block copolymer comprising at least one rigid polyamide PA block and at least one flexible block, characterized in that said copolymer includes at least one carboxylic acid chain end blocked with a polycarbodiimide.

In the present description, it is pointed out that the "copolymer-based" film means that the film comprises at least 51% by weight of copolymer relative to the total weight of the film.

Preferably, the film according to the invention comprises at least 60% by weight of said copolymer as defined by the invention. Preferably, it contains at least 70% by weight, preferably at least 80% by weight, or even at least 90%, or better still at least 95% by weight of copolymer as defined hereinbelow by the invention, relative to the total weight of the film.

The copolymer containing rigid polyamide PA blocks and flexible blocks thus defined according to the invention falls among the thermoplastic elastomer polymers. The term "thermoplastic elastomer polymer", abbreviated as "TPE", denotes a polymer which constitutes a polyphasic material having at least two transitions, namely a first transition at a temperature T1 (in general this is the glass transition temperature) and a second transition at a temperature T2 above T1 (in general this is the melting point). At a temperature below T1, the material is rigid, between T1 and T2 it has elastic behavior, and above T2 it is molten. Such a polymer combines the elastic behavior of materials of rubber type with the transformability of thermoplastics.

A polyamide-based thermoplastic elastomer (TPE-A) for the purposes of the invention, such as a PEBA, is a block copolymer comprising an alternating sequence of rigid or hard blocks (HB) and flexible or soft blocks (SB), according to the following general formula:

-[HB-SB]$_n$- and in which:
HB or Hard Block or rigid block: represents a block comprising polyamide (homopolyamide or copolyamide) or a mixture of blocks comprising polyamide (homopolyamide or copolyamide), abbreviated independently hereinbelow as PA or HB block;
SB or Soft Block or flexible block: represents a block based on polyether (PE block), polyester (PES block), polydimethylsiloxane (PDMS block), polyolefin (PO block), polycarbonate (PC block) and/or any other polymer with a low glass transition temperature, or mixtures thereof in the form of alternating, statistical or block copolymers. Preferably, SB is a block totally or partly based on polyether including alkylene oxide units.
n represents the number of repeating units in the unit -HB-SB- of said copolymer. n is within the range extending from 1 to 60, preferably from 5 to 30 or better still from 6 to 20.

For the purposes of the invention, the expression "low glass transition temperature" for a polymer included in the composition of an SB means a glass transition temperature Tg below 15° C., preferably below 0° C., preferably below −15° C., more preferably below −30° C. By way of example, said soft block may be based on PEG with a number-average molar mass equal to 1500 g/mol and a Tg of the order of −35° C. Said glass transition temperature Tg may also be below −50° C., notably in the case where said soft block is based on PTMG.

Copolyether block amides, also known as copolymers containing polyether blocks and polyamide blocks, abbreviated as "PEBA", result from the polycondensation of polyamide blocks bearing reactive ends with polyether blocks bearing reactive ends, such as, inter alia:
1) polyamide blocks bearing diamine chain ends with polyoxyalkylene blocks bearing dicarboxylic chain ends;
2) polyamide blocks bearing dicarboxylic chain ends with polyoxyalkylene blocks bearing diamine chain ends, obtained by cyanoethylation and hydrogenation of α,ω-dihydroxylated aliphatic polyoxyalkylene blocks, known as polyetherdiols;

3) polyamide blocks bearing dicarboxylic chain ends with polyetherdiols, the products obtained being, in this particular case, polyetheresteramides.

The polyamide blocks bearing dicarboxylic chain ends originate, for example, from the condensation of polyamide precursors in the presence of a chain-limiting dicarboxylic acid. The polyamide blocks bearing diamine chain ends originate, for example, from the condensation of polyamide precursors in the presence of a chain-limiting diamine.

The number-average molar mass Mn of the polyamide blocks is between 400 and 20 000 g/mol and preferably between 500 and 10 000 g/mol.

The polymers containing polyamide blocks and polyether blocks may also comprise randomly distributed units.

Three types of polyamide blocks may advantageously be used.

According to a first type, the polyamide blocks originate from the condensation of a dicarboxylic acid, in particular those containing from 4 to 20 carbon atoms, preferably those containing from 6 to 18 carbon atoms, and of an aliphatic or aromatic diamine, in particular those containing from 2 to 20 carbon atoms, preferably those containing from 6 to 14 carbon atoms.

As examples of dicarboxylic acids, mention may be made of 1,4-cyclohexanedicarboxylic acid, butanedioic acid, adipic acid, azelaic acid, suberic acid, sebacic acid, dodecanedicarboxylic acid, octadecanedicarboxylic acid, terephthalic acid and isophthalic acid, but also dimerized fatty acids.

As examples of diamines, mention may be made of tetramethylenediamine, hexamethylenediamine, 1,10-decamethylenediamine, dodecamethylenediamine, trimethylhexamethylenediamine, the isomers of bis(4-aminocyclohexyl) methane (BACM), bis(3-methyl-4-aminocyclohexyl) methane (BMACM) and 2-2-bis-(3-methyl-4-aminocyclohexyl)propane (BMACP), and para-aminodicyclohexylmethane (PACM), and isophoronediamine (IPDA), 2,6-bis(aminomethyl)norbornane (BAMN) and piperazine (Pip).

As regards the polyamide rigid block, the standard NF EN ISO 1874-1: 2011 defines a nomenclature for polyamides. In the present description, the term "monomer" should be taken as meaning "repeating unit". The case where a repeating unit of the polyamide consists of the combination of a diacid with a diamine is particular. It is considered that it is the combination of a diamine and of a diacid, i.e. the "diamine diacid", also called "XY", pair, in equimolar amount, which corresponds to the monomer. This is explained by the fact that, individually, the diacid or the diamine is only a structural unit, which is not enough by itself to polymerize.

Examples thereof are the blocks PA412, PA414, PA418, PA610, PA612, PA614, PA618, PA912, PA1010, PA1012, PA1014 and PA1018.

According to a second type, the polyamide blocks result from the condensation of one or more α,ω-aminocarboxylic acids and/or of one or more lactams containing from 6 to 12 carbon atoms in the presence of a dicarboxylic acid containing from 4 to 12 carbon atoms or of a diamine. As examples of lactams, mention may be made of caprolactam, oenantholactam and lauryllactam. As examples of α,ω-aminocarboxylic acids, mention may be made of aminocaproic acid, 7-aminoheptanoic acid, 11-aminoundecanoic acid and 12-aminododecanoic acid.

Advantageously, the polyamide blocks of the second type are made of polyamide-11, polyamide-12 or polyamide-6.

According to a third type, the polyamide blocks result from the condensation of at least one α,ω-aminocarboxylic acid (or a lactam), at least one diamine and at least one dicarboxylic acid.

In this case, the polyamide PA blocks are prepared by polycondensation:
- of the linear aliphatic or aromatic diamine(s) containing X carbon atoms;
- of the dicarboxylic acid(s) containing Y carbon atoms; and
- of the comonomer(s) {Z}, chosen from lactams and α,ω-aminocarboxylic acids containing Z carbon atoms and equimolar mixtures of at least one diamine containing X1 carbon atoms and of at least one dicarboxylic acid containing Y1 carbon atoms, (X1, Y1) being different from (X, Y);
- said comonomer(s) {Z} being introduced in a weight proportion ranging up to 50%, preferably up to 20%, even more advantageously up to 10% relative to the total amount of polyamide-precursor monomers;
- in the presence of a chain limiter chosen from dicarboxylic acids.

Advantageously, the dicarboxylic acid containing Y carbon atoms is used as chain limiter, which is introduced in excess relative to the stoichiometry of the diamine(s).

According to one variant of this third type, the polyamide blocks result from the condensation of at least two α,ω-aminocarboxylic acids or from at least two lactams containing from 6 to 12 carbon atoms or from one lactam and one aminocarboxylic acid not having the same number of carbon atoms, in the optional presence of a chain limiter. As examples of aliphatic α,ω-aminocarboxylic acids, mention may be made of aminocaproic acid, 7-aminoheptanoic acid, 11-aminoundecanoic acid and 12-aminododecanoic acid. As examples of lactams, mention may be made of caprolactam, oenantholactam and lauryllactam. As examples of aliphatic diamines, mention may be made of hexamethylenediamine, dodecamethylenediamine and trimethylhexamethylenediamine. An example of a cycloaliphatic diacid that may be mentioned is 1,4-cyclohexyldicarboxylic acid. As examples of aliphatic diacids, mention may be made of butanedioic acid, adipic acid, azelaic acid, suberic acid, sebacic acid, dodecanedicarboxylic acid, dimerized fatty acids (these dimerized fatty acids preferably have a dimer content of at least 98%; they are preferably hydrogenated; they are sold under the brand name Pripol® by the company Unichema, or under the brand name Empol® by the company Henkel) and α,ω-diacid polyoxyalkylenes. As examples of aromatic diacids, mention may be made of terephthalic acid (T) and isophthalic acid (I). As examples of cycloaliphatic diamines, mention may be made of bis(4-aminocyclohexyl)methane (BACM), bis(3-methyl-4-aminocyclohexyl)methane (BMACM), 2-2-bis(3-methyl-4-aminocyclohexyl)propane (BMACP) and para-aminodicyclohexylmethane (PACM) isomers. The other diamines commonly used may be isophoronediamine (IPDA), 2,6-bis(aminomethyl)norbornane (BAMN) and piperazine.

In the case where the PA blocks of the PEBA according to the invention comprise at least two different monomers, called "comonomers", i.e. at least one monomer and at least one comonomer (monomer other than the first monomer), they comprise a copolymer, such as a copolyamide, abbreviated as CoPA.

As examples of polyamide blocks of the third type, mention may be made of the following:
- 66/6 in which 66 denotes hexamethylenediamine units condensed with adipic acid. 6 denotes units resulting from the condensation of caprolactam.
- 66/610/11/12 in which 66 denotes hexamethylenediamine condensed with adipic acid. 610 denotes hexamethylenediamine condensed with sebacic acid. 11 denotes units resulting from the condensation of aminoundecanoic acid. 12 denotes units resulting from the condensation of lauryllactam.

The mass Mn of the flexible blocks is between 100 and 6000 g/mol and preferably between 200 and 3000 g/mol.

Preferably, the polymer comprises from 1% to 80% by mass of flexible blocks and from 20% to 99% by mass of polyamide blocks, preferably from 4% to 80% by mass of flexible blocks and from 20% to 96% by mass of polyamide blocks.

According to a preferred embodiment, the rigid polyamide block, in the copolymer containing rigid PA blocks and flexible blocks according to the invention, comprises at least one of the following polyamide units: 11, 12, 6, 610, 612, 1010, 1012, and mixtures or copolyamides thereof.

The polyether blocks PE are formed from alkylene oxide units. These units may be, for example, ethylene oxide units, propylene oxide units or tetrahydrofuran (which leads to polytetramethylene glycol sequences). Use is thus made of PEG (polyethylene glycol) blocks, i.e. blocks formed from ethylene oxide units, PPG (propylene glycol) blocks, i.e. blocks formed from propylene oxide units, PO3G (polytrimethylene glycol) blocks, i.e. blocks formed from polytrimethylene glycol ether units (such copolymers with polytrimethylene ether blocks are described in patent U.S. Pat. No. 6,590,065), and PTMG blocks, i.e. blocks formed from tetramethylene glycol units, also known as polytetrahydrofuran. The PEBA copolymers may comprise in their chain several types of polyethers, the copolyethers possibly being in block or statistical form.

Use may also be made of blocks obtained by oxyethylation of bisphenols, for instance bisphenol A. The latter products are described in patent EP 613 919.

The polyether blocks may also be formed from ethoxylated primary amines. As examples of ethoxylated primary amines, mention may be made of the products of formula:

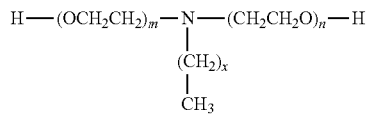

in which m and n are between 1 and 20 and x is between 8 and 18. These products are commercially available under the brand name Noramox® from the company CECA and under the brand name Genamin® from the company Clariant.

The flexible polyether blocks may comprise polyoxyalkylene blocks bearing $NH_2$ chain ends, such blocks being able to be obtained by cyanoacetylation of α,ω-dihydroxylated aliphatic polyoxyalkylene blocks referred to as polyetherdiols. More particularly, use may be made of the Jeffamine products (for example Jeffamine® D400, D2000, ED 2003, XTJ 542, which are commercial products from the company Huntsman, also described in patents JP2004346274, JP2004352794 and EP1482011).

The polyether diol blocks are either used in unmodified form and copolycondensed with polyamide blocks bearing carboxylic end groups, or they are aminated to be converted into polyetherdiamines and condensed with polyamide blocks bearing carboxylic end groups. The general method for the two-step preparation of PEBA copolymers containing ester bonds between the PA blocks and the PE blocks is known and is described, for example, in French patent FR2846332. The general method for the preparation of PEBA copolymers of the invention containing amide bonds between the PA blocks and the PE blocks is known and is described, for example, in European patent EP1482011. The polyether blocks may also be mixed with polyamide precursors and a chain-limiting diacid to make polymers containing polyamide blocks and polyether blocks having randomly distributed units (one-step process).

Needless to say, the name PEBA in the present description of the invention relates not only to the Pebax® products sold by Arkema, to the Vestamid® products sold by Evonik® and to the Grilamid® products sold by EMS, but also to the Kellaflex® products sold by DSM or to any other PEBA from other suppliers.

Advantageously, the PEBA copolymers contain PA blocks as PA 6, as PA 11, as PA 12, as PA 612, as PA 66/6, as PA 1010 and/or as PA 614, preferably PA 11 and/or PA 12 blocks; and PE blocks as PTMG, as PPG and/or as PO3G. The PEBAs based on PE blocks predominantly consisting of PEG are to be categorized in the range of hydrophilic PEBAs. The PEBAs based on PE blocks predominantly consisting of PTMG are to be categorized in the range of hydrophobic PEBAs.

Advantageously, said PEBA used in the composition according to the invention is at least partially obtained from biobased raw materials.

The term "raw materials of renewable origin" or "biobased raw materials" means materials which comprise biobased carbon or carbon of renewable origin. Specifically, unlike materials derived from fossil materials, materials composed of renewable starting materials contain $^{14}C$. The "content of carbon of renewable origin" or "content of biobased carbon" is determined by application of the standards ASTM D 6866 (ASTM D 6866-06) and ASTM D 7026 (ASTM D 7026-04). By way of example, the PEBAs based on polyamide 11 at least partly originate from biobased raw materials and have a content of biobased carbon of at least 1%, which corresponds to a $^{12}C/^{14}C$ isotope ratio of at least $1.2 \times 10^{-14}$. Preferably, the PEBAs according to the invention comprise at least 50% by mass of biobased carbon relative to the total mass of carbon, which corresponds to a $^{12}C/^{14}C$ isotope ratio of at least $0.6 \times 10^{-12}$. This content is advantageously higher, notably up to 100%, which corresponds to a $^{12}C/^{14}C$ isotope ratio of $1.2 \times 10^{-12}$, in the case, for example, of PEBA containing PA 11 blocks and PE blocks comprising PO3G, PTMG and/or PPG derived from starting materials of renewable origin.

The polyester blocks PES are usually manufactured by polycondensation between a dicarboxylic acid and a diol. Suitable carboxylic acids comprise those mentioned above used for forming the polyamide blocks, with the exception of terephthalic acid and isophthalic acid. Suitable diols comprise linear aliphatic diols such as ethylene glycol, 1,3-propylene glycol, 1,4-butylene glycol, 1,6-hexylene glycol, branched diols such as neopentyl glycol, 3-methylpentane glycol, 1,2-propylene glycol, and cyclic diols such as 1,4-bis(hydroxymethyl)cyclohexane and 1,4-cyclohexanedimethanol.

The term "polyesters" also means poly(caprolactone) and PESs based on fatty acid dimers, in particular the products of the Priplast® range from the company Croda or Uniqema.

It is also possible to envisage a PES block of alternating, statistical or block "copolyester" type, containing a sequence of at least two types of PES mentioned above.

For the purposes of the invention, the term polysiloxane block (abbreviated hereinbelow as PSi) means any organosilicon polymer or oligomer of linear or cyclic, branched or crosslinked structure, obtained by polymerization of functionalized silanes, and consisting essentially of a repetition of main units in which silicon atoms are linked together via oxygen atoms (siloxane bond —Si—O—Si—), optionally substituted hydrocarbon-based radicals being directly linked via a carbon atom to said silicon atoms. The most common hydrocarbon-based radicals are alkyl radicals, notably of C1-C10 and in particular methyl, fluoroalkyl radicals, aryl radicals and in particular phenyl, and alkenyl radicals and in particular vinyl; other types of radicals that may be bonded, either directly or via a hydrocarbon-based radical, to the siloxane chain are notably hydrogen, halogens and in particular chlorine, bromine or fluorine, thiols, alkoxy radicals, polyoxyalkylene (or polyether) radicals and in particular polyoxyethylene and/or polyoxypropylene, hydroxyl or hydroxyalkyl radicals, substituted or unsubstituted amine groups, amide groups, acyloxy or acyloxyalkyl radicals, hydroxyalkylamino or aminoalkyl radicals, quaternary ammonium groups, amphoteric or betaine groups, anionic groups such as carboxylates, thioglycolates, sulfosuccinates, thiosulfates, phosphates and sulfates, and mixtures thereof, this list obviously not being in any way limiting ("organomodified" silicones).

Preferably, said polysiloxane blocks comprise polydimethylsiloxane (abbreviated hereinbelow as PDMS blocks), polymethylphenylsiloxane and/or polyvinylsiloxane.

For the purposes of the invention, the term polyolefin block (abbreviated hereinbelow as PO block) means any polymer comprising an α-olefin as monomer, i.e. homopolymers of an olefin or copolymers of at least one α-olefin and of at least one other copolymerizable monomer, the α-olefin advantageously containing from 2 to 30 carbon atoms.

As examples of α-olefins, mention may be made of ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene. These α-olefins may be used alone or as a mixture of two or of more than two.

Examples that may be mentioned include:
ethylene homopolymers and copolymers, in particular low-density polyethylene (LDPE), high-density polyethylene (HDPE), linear low-density polyethylene (LLDPE), very-low-density polyethylene (VLDPE) and polyethylene obtained by metallocene catalysis,
propylene homopolymers and copolymers,
essentially amorphous or atactic poly-α-olefins (APAO),
ethylene/α-olefin copolymers such as ethylene/propylene, EPR (ethylene-propylene-rubber) elastomers and EPDM (ethylene-propylene-diene) elastomers, and mixtures of polyethylene with an EPR or an EPDM,
styrene/ethylene-butene/styrene (SEBS), styrene/butadiene/styrene (SBS), styrene/isoprene/styrene (SIS) and styrene/ethylene-propylene/styrene (SEPS) block copolymers;
copolymers of ethylene with at least one product chosen from salts or esters of unsaturated carboxylic acids, for instance alkyl (meth)acrylates, the alkyl possibly containing up to 24 carbon atoms, vinyl esters of saturated carboxylic acids, for instance vinyl acetate or propionate, and dienes, for instance 1,4-hexadiene or polybutadiene.

According to an advantageous embodiment of the invention, said at least one polyolefin block comprises polyisobutylene and/or polybutadiene.

According to a particularly advantageous embodiment, the block copolymer according to the invention includes at least one flexible polyolefin block (PO block) and at least one hard hydrophilic block (abbreviated hereinbelow as hHB) comprising both polyamide and polyether, such as a polyetheramide block, a polyetheresteramide block and/or a polyetheramideimide block, etc. Said PO block preferably comprises a polyolefin including acid, alcohol or amine end groups. Preferably, the PO block is obtained by thermal degradation of high molecular weight polyolefins to form polyolefins of lower mass and functionalized (reference method: Japanese Kokai Publication Hei-03-62804). As regards the hHB block, it may also comprise at least one polymer chosen from: cationic polymers of quaternary amine type and/or phosphorus derivatives; and/or anionic polymers, of modified diacid type, including a sulfonate group and which are capable of reacting with a polyol. The addition of organic salt may then be envisaged in the preparation of the hHB block or during the reaction between the PO block and the hHB block. U.S. Pat. No. 6,552,131 describes the synthesis and the various possible structures for the copolymer containing PO blocks and hHB blocks, it being possible, needless to say, for the latter to be envisaged in the process according to the invention.

For the purposes of the invention, the term polycarbonate block (abbreviated hereinbelow as PC block) more particularly means any aliphatic polycarbonate. Aliphatic polycarbonates are described, for example, in DE2546534 and JP1009225. Such polycarbonate homopolymers or copolymers are also described in U.S. Pat. No. 471,203. Patent applications WO 92/22600 and WO 95/12629 describe copolymers comprising polycarbonate blocks and also the processes for synthesizing same. The blocks (and the synthesis thereof) described in said documents may be entirely envisaged for the synthesis of a PC block copolymer according to the invention. Preferably, the polycarbonate blocks of the copolymer according to the invention have the formula:

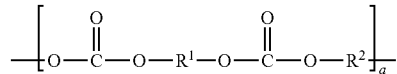

in which a is an integer from 2 to 300; R1 and R2, which may be identical or different, represent a straight or branched, aliphatic or alicyclic chain containing from 2 to 18 carbon atoms, or represent a polyoxyalkylene group, or represent a polyester group.

The polycarbonates in which R1 and R2 are chosen from hexylene, decylene, dodecylene, 1,4-cyclohexylene, 2,2-dimethyl-1,3-propylene, 2,5-dimethyl-2,5-hexylene or polyoxyethylene groups are preferred.

If the block copolymers described above generally comprise at least one rigid polyamide block and at least one flexible block, it is obvious that the present invention in fact covers all the copolymers comprising two, three, four (or even more) different blocks chosen from those described in the present description, provided that at least one of these blocks is a polyamide block.

Advantageously, the copolymer according to the invention comprises a block segmented copolymer comprising three different types of blocks (referred to as "triblock" in the present description of the invention), which result from the condensation of several of the blocks described above. Said triblock is preferably chosen from copolyetheresteramides and copolyetheramideurethanes in which:
the mass percentage of rigid polyamide block is greater than 10%;
the mass percentage of flexible blocks is greater than 20%; relative to the total mass of triblock.

According to a preferred embodiment, the flexible block in the film based on a copolymer containing rigid PA blocks and flexible blocks according to the invention comprises (and preferably is) a polyether PE block, preferably chosen from PTMG, PPG, PO3G and/or PEG.

According to another advantageous embodiment, the flexible block in the copolymer containing rigid PA blocks and flexible blocks of the film according to the invention comprises (and preferably is) a polyester PES block, chosen from polyester diols, poly(caprolactone) and polyesters based on fatty acid dimers.

Advantageously, in the copolymer according to the invention, the weight ratio of the PA blocks to the flexible blocks is within the range from 0.3 to 10, preferably from 0.3 to 6, preferably from 0.3 to 3, preferably from 0.3 to 2.

Preferably, said copolymer based on the film according to the invention comprises from 45% to 75% by weight of flexible polyethylene glycol (PEG) blocks, preferably from 50% to 70% by weight of PEG blocks, relative to the total weight of copolymer.

Preferably, said rigid polyamide PA block of the copolymer used in the film of the invention comprises at least one of the following polyamide units: 6, 66, 610, 612, PA1010, PA1012, PA11, PA12, PA6/12, PA6/66, and mixtures or copolyamides thereof. Advantageously, the copolymer comprises a copolymer containing rigid polyamide blocks and flexible polyether blocks (PEBA), preferably chosen from the following PEBAs: PA6-PEG, PA1010-PEG, PA1012-PEG, PA11-PEG, PA12-PEG, PA6/12-PEG, PA66-PEG, PA6/66-PEG, and mixtures thereof.

Polycarbodiimides that are suitable for the present invention are represented by the following general formula:

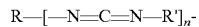

in which R is monovalent, R' is divalent, n is from 2 to 50, preferably from 2 to 45, preferably from 2 to 20 and preferably from 5 to 20.

R may be, for example, a C1-C20 alkyl or C3-C10 cycloalkyl or C1-C20 alkenyl group, and may be cyclic or branched, or may contain a C8-C16 aromatic nucleus, and may be substituted with functional groups.

R' may be a divalent group corresponding to all the foregoing, for example a C1-C20 alkylene, a C3-C10 cycloalkylene, etc. Examples of functional groups comprise, without being limited thereto, cyanato and isocyanato, halo, amido, carboxamido, amino, imido, imino, silyl, etc. These lists are intended solely for illustrative purposes and not for the purpose of limiting the scope of the present invention. As examples of polycarbodiimides that may be used according to the present invention, mention may be made of repeated units of N,N'-dicyclohexylcarbodiimide, N,N'-diisopropylcarbodiimide, N,N'-diphenylcarbodiimide, N,N'-bis(2,6-diisopropylphenyl)carbodiimide, 4,4'-dicyclohexylmethanecarbodiimide, tetramethylxylylenecarbodiimide (aromatic carbodiimide), N,N-dimethylphenylcarbodiimide, N,N'-bis(2,6-diisopropylphenyl)carbodiimide, 2,2',6,6'-tetraisopropyldiphenylcarbodiimide (aromatic carbodiimide), aromatic homopolymer of 1,3,5-triisopropyl-2,4-diisocyanatobenzene, aromatic heteropolymer of 1,3,5-triisopropyl-2,4-diisocyanatobenzene and 2,6-diisopropylphenyl isocyanate, or combinations thereof.

Specific examples of R' comprise, without being limited thereto, divalent radicals derived from 2,6-diisopropylbenzene, naphthalene, 3,5-diethyltoluene, 4,4'-methylenebis(2,6-diethylenephenyl), 4,4'-methylenebis(2-ethyl-6-methylphenyl), 4,4'-methylenebis(2,6-diisopropylphenyl), 4,4'-methylenebis(2-ethyl-5-methylcyclohexyl), 2,4,6-triisopropylphenyl, n-hexane, cyclohexane, dicyclohexylmethane and methylcyclohexane, and analogs. Patents U.S. Pat. Nos. 5,130,360, 5,859,166, 368,493, 7,456,137, US 2007/0278452, US 2009/0176938, and in particular U.S. Pat. No. 5,360,888 describe more examples of polycarbodiimides.

Suitable polycarbodiimides may be obtained from commercially available sources such as the Stabaxol P series from Rhein Chemie, the Stabilizer series from Raschig, and others from Ziko or Teijin, for example.

Advantageously, the polycarbodiimide is chosen from a Stabilizer product, in particular Stabilizer® 9000 corresponding to poly(1,3,5-triisopropylphenylene-2,4-carbodiimide), a Stabaxol® product, notably a Stabaxol® P product, in particular Stabaxol® P100 or Stabaxol® P400, or a mixture thereof.

Preferably, the polycarbodiimide has a weight-average molecular mass of greater than 10 000 g/mol.

Advantageously, the weight-average molecular mass of the polycarbodiimide is within the range from 10 000 to 40 000 g/mol, preferably from 15 000 to 30 000 g/mol.

The weight content of the polycarbodiimide advantageously represents from 0.5% to 10% by weight, preferably from 0.5% to 7% by weight, preferably from 0.5% to 3% by weight, preferably from 0.5% to 2.5%, preferably from 0.5% to 2% by weight, relative to the total weight of the copolymer according to the invention.

According to an advantageous embodiment of the invention, said carboxylic acid of the copolymer, in the film according to the invention, forms a urea bond by reaction with a carbodiimide of the polycarbodiimide.

One of the advantages of the block copolymer bearing a blocked acid chain end based on the film according to the invention is that it remains in noncrosslinked linear form, the dispersity Mw/Mn of the copolymer being less than 3. This is surprising insofar as, in the prior art, carbodiimides are rather used for increasing the viscosity of polyamides (see, for example, patent FR 3027907), notably by crosslinking them, and for improving their resistance to hydrolysis as described in U.S. Pat. No. 5,360,888.

A subject of the present invention is also the use of a polycarbodiimide in a process for manufacturing a film based on a copolymer containing polyamide blocks and flexible blocks including at least one carboxylic acid chain end, for improving the extrudability and/or the drawability of the copolymer in film form and/or for improving the extrusion rate of said copolymer, in which at least one carboxylic acid chain end of the copolymer is blocked with a carbodiimide function of the polycarbodiimide.

A subject of the present invention is also the use of a polycarbodiimide in a film based on a copolymer containing polyamide blocks and flexible blocks including at least one carboxylic acid chain end, for improving the stretchability of the film, the flexibility of the film, its abrasion resistance and its tear strength, in which at least one carboxylic acid chain end of the copolymer is blocked with a carbodiimide function of the polycarbodiimide.

Preferably, for the use according to the invention, the polycarbodiimide has a weight-average molecular mass of greater than 10 000 g/mol, preferably within the range from 10 000 to 40 000 g/mol, preferably from 15 000 to 30 000 g/mol.

Preferably, the weight-average molecular mass of the polycarbodiimide used in the present invention is measured by gel permeation chromatography (GPC) in tetrahydrofuran (THF).

Advantageously, at least one carboxylic acid chain end of the copolymer is blocked with a urea function formed by reaction with the polycarbodiimide.

A subject of the present invention is also a copolymer-based film composition according to the invention, characterized in that it comprises:
- from 51% to 99.9% by weight of said block copolymer as defined above,
- from 0.1% to 49% by weight of at least one other component chosen from polyamides, functional polyolefins, copolyetheresters, thermoplastic polyurethanes (TPU), copolymers of ethylene and vinyl acetate, copolymers of ethylene and of acrylate, and copolymers of ethylene and of alkyl (meth)acrylate, and/or
- from 0.1% to 10% by weight of additives chosen from nucleating agents, fillers, notably mineral fillers, such as talc, reinforcing fibers, notably glass or carbon fibers, dyes, UV absorbers, antioxidants, notably phenolic or phosphorus-based or sulfur-based antioxidants, hindered-amine light stabilizers (HALS), and mixtures thereof, relative to the total weight of the composition.

Advantageously, the film according to the invention comprises a functional polyolefin including a grafting with a monomer chosen from the group comprising unsaturated carboxylic acids, unsaturated carboxylic anhydrides, vinyl monomers, acrylic monomers, and mixtures thereof.

Preferably, the functional polyolefin is chosen from the group comprising ethylene-acrylic ester copolymers, ethylene-acrylic ester-maleic anhydride copolymers, and ethylene-acrylic ester-glycidyl methacrylate copolymers.

Advantageously, the film according to the invention has a thickness of less than or equal to 100 µm, preferably less than or equal to 50 µm, preferably less than or equal to 30 µm, preferably less than or equal to 25 µm, preferably in the range from 5 to 25 µm.

A subject of the present invention is also a process for manufacturing the film according to the invention, comprising the steps of:
a) providing the copolymer including at least one carboxylic acid chain end blocked with a polycarbodiimide, optionally as a mixture with other components of the film as described above,
b) extruding the copolymer or said mixture from step a),
c) drawing the copolymer or said mixture to form a film.

According to a particular embodiment, the process of the invention comprises, prior to step a), the mixing of the block copolymer comprising at least one rigid polyamide PA block and at least one flexible block and polycarbodiimide, so that at least one carboxylic acid chain end of the block copolymer reacts with a carbodiimide function of the polycarbodiimide. Preferably, what the mixing is performed using a single-screw or twin-screw extruder or by adding polycarbodiimide during the synthesis of the block copolymer.

Advantageously, the drawing step c) is performed by extrusion blow molding, blown film extrusion, pultrusion, overjacketing extrusion, extrusion calendering, flat-die extrusion, extrusion coating, lamination and/or coextrusion.

Advantageously, step b) is performed at a temperature in the range from 80 to 350° C., preferably from 100° C. to 300° C., preferably from 150 to 250° C.

The use of a copolymer blocked with a polycarbodiimide according to the invention allows a larger window of processability notably in terms of temperature, and less extrusion instability is observed than with the corresponding non-blocked copolymer, and also higher maximum achievable extrusion rates.

A subject of the present invention is also a laminated product comprising at least one textile material and at least one film according to the invention, said film adhering to at least one surface of the textile material with a peel force that is within the range from 0.5 to 50 N, preferably from 0.5 to 10 N, measured according to the standard ISO 11339.

Preferably, said at least one textile material is in the form of a porous membrane, a woven textile or a nonwoven textile.

Preferably, said at least one textile material comprises synthetic fibers, notably synthetic fibers obtained from biobased raw materials, natural fibers, artificial fibers manufactured from natural raw materials, mineral fibers and/or metallic fibers.

Advantageously, said at least one textile material constitutes a felt, a filter, a film, a gauze, a cloth, a dressing, a layer, a fabric, a knitted fabric, a clothing article, an item of clothing, a bedding article, a furnishing article, a curtain, a passenger compartment covering, a functional technical textile, a geotextile and/or an agrotextile.

A subject of the present invention is also the use of a film according to the invention in the following sectors: medical, hygiene, luggage, manufacturing, clothing, domestic or household equipment, furnishing, carpet, motor vehicle, industry, notably industrial filtration, agriculture and/or construction.

Said film according to the invention advantageously constitutes a wrapping component, notably in the agri-food sector, a food wrapping film, a wrapping film for cooking and/or smoking, notably for sausages, a waterproof breathable film, notably used in construction, a textile, sports equipment, shoe, sports shoe, shoe sole, decorative, luggage, spectacle, furniture, audiovisual equipment, information technology, motor vehicle or aeronautical equipment component and/or a medical equipment component.

EXAMPLES

The examples that follow illustrate the invention without limiting it. The standards used in the examples also correspond to those used more generally for characterizing the invention in the description or the claims.

Materials Used

In the examples that follow:
PEBA 1: PA 12-PTMG (Mn: 600-2000)
PEBA 1 is a copolymer containing PA 12 blocks and PTMG blocks with respective number-average molecular masses (Mn) of 600-2000.
Copo 1: 98.5% PEBA 1 +1.5% PCDI
PEBA 2: PA 12-PTMG (Mn: 850-2000)

PEBA 2 is a copolymer according to the invention, containing PA 12 blocks and PTMG
blocks with respective number-average molecular masses (Mn) of 850-2000.
Copo 2: 98% PEBA 2+2% PCDI
PEBA 3: PA 12-PTMG (Mn: 2000-1000)
PEBA 3 is a copolymer according to the invention, containing PA 12 blocks and PTMG blocks with respective number-average molecular masses (Mn) of 2000-1000.
Copo 3: 98.5% PEBA 3 +1.5% PCDI
PEBA 4: PA11-PTMG (600-1000)
PEBA 4 is a copolymer containing PA 11 blocks and PTMG blocks with respective number-average molecular masses (Mn) of 600-1000.
Copo 4: 98% PEBA 4+2% PCDI
PCDI: Polycarbodiimide used in the examples: Poly(1,3,5-triisopropylphenylene-2,4-carbodiimide)
Waterproof breathable films were prepared from the above materials.
The moisture breathability (or MVTR) of the various films of the abovementioned materials (PEBAs and Copos) is measured. For all the cases, the MVTR of the PEBA film and that of the corresponding Copo film are substantially identical: the moisture breathability (MVTR) measured is greater than 100 g/m2 per 24 hours at 23° C. for a relative humidity rate of 50% and a sample thickness of 30 µm, measured according to the standard ASTM E 96B.
The adherence of the films is directly linked to the peel force values. The peel tests are preferably performed within a period of between 2 hours and 48 hours after manufacturing a laminate comprising an adhesive 25 µm PEBA or Copo film, by extrusion coating, on a nonwoven polypropylene textile. A peel test was performed on the laminates of each of the tests (according to the standard ISO 11339) on a 15 mm strip of laminate initiated and then pulled at a speed of 200 mm/minute.
For all the laminates, the peel force of the PEBA film and of the corresponding Copo film remain substantially the same; the measured value is greater than 0.5 N in each case.

Example 1: Measurement of the Extrudability of the PEBA and Copo Materials

Table 1 below gives the results of the melt viscosity measurement eta* (in Pa·s) at 220° C., as a function of the angular frequency (rad/s) according to the standard ISO 6721-10:2015.

TABLE 1

| Angular frequency [1/s] | eta*-PEBA 1 [Pa · s] | eta*-Copo 1 [Pa · s] | eta*-PEBA 3 [Pa · s] | eta*-Copo 3 [Pa · s] | eta*-PEBA 4 [Pa · s] | eta*-Copo 4 [Pa · s] |
|---|---|---|---|---|---|---|
| 628 | 206 | 363 | 312 | 404 | 182 | 361 |
| 292 | 258 | 508 | 415 | 575 | 237 | 518 |
| 135 | 302 | 659 | 516 | 767 | 288 | 705 |
| 62.8 | 334 | 802 | 606 | 967 | 337 | 943 |
| 29.2 | 353 | 923 | 676 | 1160 | 382 | 1190 |
| 13.5 | 363 | 1010 | 726 | 1340 | 418 | 1490 |
| 6.28 | 368 | 1080 | 761 | 1510 | 444 | 1820 |
| 2.92 | 372 | 1120 | 785 | 1660 | 461 | 2170 |
| 1.35 | 375 | 1150 | 805 | 1810 | 470 | 2520 |
| 0.628 | 379 | 1170 | 825 | 1980 | 476 | 2830 |
| 0.292 | 381 | 1170 | 849 | 2260 | 472 | 3080 |
| 0.135 | 396 | 1190 | 930 | 2910 | 477 | 3380 |
| 0.0628 | 442 | 1210 | 1190 | 4200 | 498 | 3750 |

It is observed that the Copo materials according to the invention have a greater melt viscosity than the comparative PEBAs.
The Copo materials according to the invention are thus more readily extrudable into films than the comparative PEBA materials.

Figure 2:
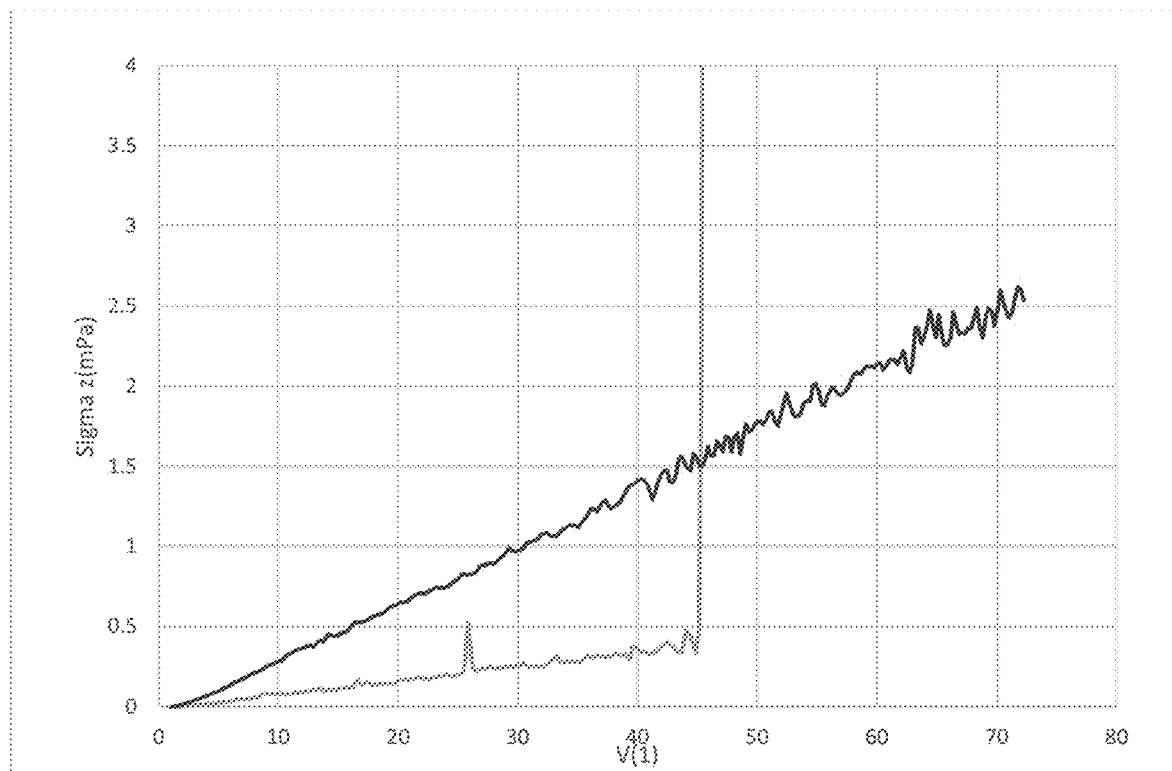
FIG. 2 represents the result of the elongational rheology measurement on PEBA 4 (bottom curve) and on Copo 4 (top curve).

Example 2: Measurement of the Drawability of the PEBAs and Copos by Means of a Rheotens Description of the Elongational Rheology Test Principle: A rod is extruded through a die of a capillary rheometer; it is gripped, in molten form, by two pairs of wheels driven by a variable-speed motor. A first pair of wheels and the motor are mounted at the free, deflectable end of a support directly connected to a sensor, representing the restoring force.
The second pair of wheels (coupled to the first pair) makes it possible to guide and to limit the winding of the rod around the upper wheels. Small pads soaked with surfactant liquid (mixture of water, ethanol and surfactant) are also applied to the wheels in order to cool them and thus to limit the sticking effect.
The melt strength curves of FIGS. 1 and 2 represent the elongation stress on the y-axis as a function of the elongation factor on the x-axis.

$$\text{Elongation stress: } \sigma_2 = \frac{F \cdot v}{A_0 \cdot v_0}$$

$$\text{Elongation factor: } V = \frac{v}{v_0}$$

with V: speed at which the rod is drawn: wheel speed.
F: Force applied by the rod
$A_0$: Area of the rod when it leaves the die
$V_0$: Extrusion speed of the rod leaving the die
Operating conditions:
Capillary rheometer:
Device: Gottfert Rheotester 2000 capillary rheometer.
Die: 30 mm×1 mm dies L/d=30/1
Sensor: 0-1400 bar (reference 131055)
Preheating time: 300 s (5 min)
Test temperatures: 150° C. or 180° C. depending on the grades
Shear rate: 50 $s^{-1}$
Rheotens:
Wheels: Notched stainless steel
Draw height: 105 mm
Gap: about~0.6 mm
Vo (initial speed)~6 mm/s
Accelerations: a*t, a=2.4 $mm/s^2$
Lubrication: mixture of water+surfactant
Piston diameter: 12 mm
Piston speed: 0.043 mm/s
FIG. 1 represents the result of the elongational rheology measurement on PEBA 3 (bottom curve) and on Copo 3 (top curve) at 180°° C.
FIG. 2 represents the result of the elongational rheology measurement on PEBA 4 (bottom curve) and on Copo 4 (top curve) at 150° C.
The copolymers Copo 3 and Copo 4 used in the films according to the invention have improved drawability relative to that of the respective controls PEBA 3 and PEBA 4.
The films according to the invention based on block copolymers including at least one carboxylic acid chain end blocked with a polycarbodiimide have improved stretchability relative to that of the films based on the same respective non-blocked copolymers.

Example 3—Comparison of the Tensile Modulus and Flexural Modulus Values of the Various PEBAs and Copos The results of these tests are given in table 2 below.

TABLE 2

| Standards | Tests | Units | PEBA 1 | Copo 1 | PEBA 2 | Copo 2 | PEBA 3 | Copo 3 | PEBA 4 | Copo 4 |
|---|---|---|---|---|---|---|---|---|---|---|
| ISO 527 1A: 1012 | Tensile modulus at 23° C. | MPa | 12 | 11 | 20 | 18 | 209 | 193 | 45 | 39 |
| ISO 178: 2010 | Flexural modulus at 23° C. | MPa | 15 | 11 | | | 184 | 177 | | |

The copolymers Copo 1 and Copo 4 used in the textile materials according to the invention have tensile modulus and flexural modulus values lower than those of the respective controls PEBA 1 to 4.

The films according to the invention based on block copolymers including at least one carboxylic acid chain end blocked with a polycarbodiimide have improved flexibility relative to that of the films based on the same respective non-blocked copolymers.

Example 4—Comparison of the Abrasion Resistance and Tear Strength of the Various PEBAs and Copos The results of these tests are given in table 3 below.

TABLE 3

| Standards | Tests | Units | PEBA 1 | Copo 1 | PEBA 2 | Copo 2 | PEBA 3 | Copo 3 | PEBA 4 | Copo 4 |
|---|---|---|---|---|---|---|---|---|---|---|
| ISO 9352: 2012 | Abrasion resistance Loss of mass and | mg | n = 4 36.7 7.3 | n = 4 26.3 6.0 | n = 4 41.9 4.4 | n = 4 33.9 3.3 | n = 4 17.0 3.9 | n = 4 13.1 2.4 | n = 4 55.4 2.8 | n = 4 41.9 2.9 |
| ISO 34-1: 2015 | Tear strength Median SI min max Median SO min max | kN/m  kN/m | n = 5 41 37 45 29 27 35 | n = 5 48 45 49 33 31 35 | | | | | | |

The loss of mass is smaller in the case of the copolymers according to the invention, and the copolymer-based films according to the invention thus have better abrasion resistance than the respective control PEBA-based films. Similarly, the films based on the copolymers according to the invention have a better tear strength than the respective control PEBA-based films.

Example 5—Measurement of the Dispersity of the Various PEBAs and Copos

The weight-average and number-average molecular masses Mw and Mn measured increase, respectively, on passing from a PEBA to the corresponding Copo used in the films according to the invention, which indicates that the reaction took place between the carbodiimide function of the polycarbodiimide and the acid function of the PEBA to form the Copo bearing a blocked acid chain end used according to the invention.

The dispersity is determined as being equal to the ratio between the weight-average molecular mass and the number-average molecular mass Mw/Mn. The measurement accuracy is given to within 5%.

The number-average molecular (or molar) mass is set by the content of chain limiter. It may be calculated according to the equation:

$$Mn = (n_{monomer}/n_{limiter}) * M_{repeating\ unit} + M_{limiter}$$

$n_{monomer}$=number of moles of monomer
$n_{limiter}$=number of moles of diacid in excess
$M_{repeating\ unit}$=molar mass of repeating unit
$M_{limiter}$=molar mass of diacid in excess The dispersity Mw/Mn is moreover conserved in each Copo according to the invention relative to the corresponding initial PEBA, and the measured value is less than 3, in all the copolymers, which proves that the copolymers according to the invention remained in noncrosslinked linear form. The films based on these copolymers thus remain perfectly recyclable.

In summary, the polycarbodiimide thus used in the film according to the present invention makes it possible to improve the extrudability, stretchability, flexibility, abrasion resistance and tear strength properties of the film, while at the same time conserving its moisture breathability, its adherence and its recyclability.

These advantageous properties were not able to be observed with monomeric carbodiimides, since their volatility did not enable them to react or to effectively block said carboxylic acid of the block copolymer used in the film of the present invention.

The invention claimed is:

1. A flexible, stretchable, waterproof breathable film based on a block copolymer comprising at least one rigid polyamide PA block and at least one flexible block, wherein said copolymer includes at least one carboxylic acid chain end blocked with a polycarbodiimide, wherein said copolymer is in noncrosslinked linear form, its dispersity Mw/Mn being less than 3,
wherein the at least one flexible block comprises a polyetherdiol.

2. The film as claimed in claim 1, in which the weight-average molecular mass of the polycarbodiimide is greater than 10,000 g/mol.

3. The film as claimed in claim 1, wherein the weight content of the at least one carboxylic acid chain end blocked with a polycarbodiimide being from 0.5% to 10% relative to the total weight of the copolymer.

4. The film as claimed in claim 1, wherein said carboxylic acid forms a urea bond by reaction with the carbodiimide of the polycarbodiimide.

5. The film as claimed in claim 1, wherein said flexible block comprises at least one block selected from the group consisting of polyether, polyester, polydimethylsiloxane, polyolefin, polycarbonate, and mixtures or copolymers thereof.

6. The film as claimed in claim 1, wherein said at least one flexible block comprising a polyetherdiol is selected from the group consisting of poly (tetramethyene glycol) (PTMG), poly (1,2-propylene glycol) (PPG), poly (1,3, propylene glycol) (P03G), poly (ethylene glycol) (PEG) and mixtures thereof.

7. The film as claimed in claim 1, wherein said at least one copolymer comprises from 45% to 75% by weight of flexible polyethylene glycol (PEG) blocks, relative to the total weight of copolymer.

8. The film as claimed in claim 1, wherein said polyamide PA block comprises at least one of the following polyamide units: 6, 66, 610, 612, PA1010, PA1012, PA11, PA12, PA6/12, PA6/66, and mixtures or copolyamides thereof.

9. The film as claimed in claim 1, wherein said at least one copolymer comprises a copolymer containing rigid polyamide blocks and flexible polyether blocks (PEBA).

10. The film as claimed in claim 1, wherein said at least one copolymer is chosen from the following PEBAs: PA6-PEG, PA1010-PEG, PA1012-PEG, PA11-PEG, PA12-PEG, PA6/12-PEG, PA66-PEG, PA6/66-PEG, and mixtures thereof.

11. The film as claimed in claim 1, wherein the weight ratio of the PA blocks to the flexible blocks is within the range from 0.3 to 10.

12. The film as claimed in claim 1, wherein said film comprises:
from 51% to 99.9% by weight of said block copolymer,
and further comprising from 0.1% to 49% by weight of at least one other component selected from the group consisting of polyamides, functional polyolefins, copolyetheresters, thermoplastic polyurethanes (TPU), copolymers of ethylene and vinyl acetate, copolymers of ethylene and of acrylate, and copolymers of ethylene and of alkyl (meth) acrylate, and/or
from 0.1% to 10% by weight of additives selected from the group consisting of nucleating agents, fillers, mineral fillers, talc, reinforcing fibers, glass or carbon fibers, dyes, UV absorbers, antioxidants, phenolic or phosphorus-based or sulfur-based antioxidants, hindered-amine light stabilizers (HALS), and mixtures thereof,
relative to the total weight of the film.

13. The film as claimed in claim 12, wherein said film comprises a functional polyolefin grafted with a monomer selected from the group consisting of unsaturated carboxylic acids, unsaturated carboxylic anhydrides, vinyl monomers, acrylic monomers, and mixtures thereof.

14. The film as claimed in claim 13, wherein the functional polyolefin is selected from the group consisting of ethylene-acrylic ester copolymers, ethylene-acrylic ester-maleic anhydride copolymers, and ethylene-acrylic ester-glycidyl methacrylate copolymers.

15. The film as claimed in claim 1, wherein the film has a thickness of less than or equal to 25 µm.

16. A laminated product comprising at least one textile material and at least one film as claimed in claim 1, said film adhering to at least one surface of the textile material with a peel force that is within the range from 0.5 to 50 N.

17. The laminated product as claimed in claim 16, wherein said at least one textile material is in the form of a porous membrane, a woven textile or a nonwoven textile.

18. The laminated product as claimed in claim 16, wherein said at least one textile material comprises synthetic fibers, synthetic fibers obtained from biobased raw materials, natural fibers, artificial fibers manufactured from natural raw materials, mineral fibers and/or metallic fibers.

19. The laminated product as claimed in claim 16, wherein said at least one textile material constitutes a felt, a filter, a film, a gauze, a cloth, a dressing, a layer, a fabric, a knitted fabric, a clothing article, an item of clothing, a bedding article, a furnishing article, a curtain, a passenger compartment covering, a functional technical textile, a geotextile and/or an agrotextile.

20. An article comprising the film as claimed in claim 1, wherein said article is selected from the group consisting of a medical article, hygiene article, manufacturing article, clothing, domestic or household equipment, a furnishing, carpet, a motor vehicle, industrial filtration article, agriculture article, construction article wrapping component, agrifood wrap, a food wrapping film, a wrapping film for cooking and/or smoking, film for sausages, a waterproof breathable film, construction film, a textile component, a sports equipment, shoe, sports shoe, shoe sole, decorative, luggage, spectacle, furniture, audiovisual equipment, information technology, motor vehicle or aeronautical equipment component and a medical equipment component.

* * * * *